(12) United States Patent
Hihnala et al.

(10) Patent No.: US 6,582,290 B2
(45) Date of Patent: Jun. 24, 2003

(54) DEVICE AND METHOD FOR DETACHING COATING SKINS FROM PROCESSED MEAT PRODUCTS

(75) Inventors: Esa Hihnala, Lohja (FI); Roland Tallberg, Hanko (FI)

(73) Assignee: Eriksson Capital AB, Mariehamn (FI)

( * ) Notice: Subject to any disclaimer, the term of this patent is extended or adjusted under 35 U.S.C. 154(b) by 0 days.

(21) Appl. No.: 09/978,017

(22) Filed: Oct. 17, 2001

(65) Prior Publication Data

US 2003/0054747 A1 Mar. 20, 2003

(30) Foreign Application Priority Data

Sep. 19, 2001 (FI) .............................................. 20011844

(51) Int. Cl.$^7$ .......................... A22C 13/00; A22C 11/06
(52) U.S. Cl. ......................................... 452/50; 452/32
(58) Field of Search ............................... 452/31, 32, 50

(56) References Cited

U.S. PATENT DOCUMENTS 4,118,828 A * 10/1978 Melanson .................... 452/50

FOREIGN PATENT DOCUMENTS

| DE | 1632127 B | * | 1/1976 | ............ A22C/11/00 |
| JP | 10262544 A | * | 10/1998 | ............ A22C/13/00 |
| JP | 2001103904 A | * | 4/2001 | ............ A22C/13/00 |

* cited by examiner

Primary Examiner—Charles T. Jordan
Assistant Examiner—Susan C. Alimenti
(74) Attorney, Agent, or Firm—Young & Thompson

(57) ABSTRACT

The present invention relates to a device and a method for detaching a fibrous casing from the surface of a cured processed meat product, preferably a sausage, especially when the outer surface of the fibrous casing has been provided with a substantially inextensible net with a view to form protuberances on the surface of the processed meat mixture. The device is used for blowing compressed air between the fibrous casing and the surface of the cured processed meat mixture, so that the fibrous casing is detached from the surface of the processed meat mixture and skin removal is facilitated.

9 Claims, 1 Drawing Sheet

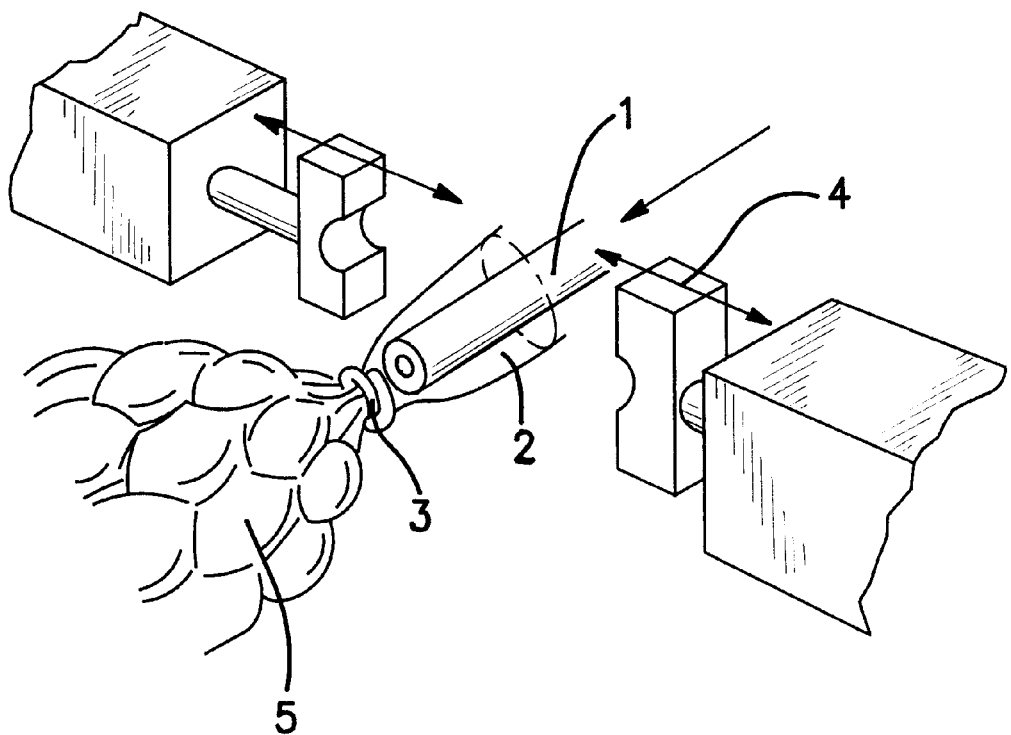

DEVICE AND METHOD FOR DETACHING COATING SKINS FROM PROCESSED MEAT PRODUCTS

FIELD OF THE INVENTION

The present invention relates to a device for detaching coating skins from processed meat products, and especially for detaching a fibrous casing equipped with a net from a processed meat product in order to facilitate peeling. The present invention further relates to a method using such a device.

BACKGROUND OF THE INVENTION

Fibrous casings are commonly used for packaging processed food products, especially sausages and more specifically sausages of salami type, while they are being cured. In order to shape the sausage surface, one can use a fibrous casing having a solid, substantially inextensible net on its outside. The fibrous casing has been adapted to form projections protruding from the net apertures as the casing is being stuffed with sausage mixture. For these protuberances to give the slice edge a decorative wavy shape as the sausage tube is being sliced, it is vital that the casing be tightly filled. While the sausage is being cured, the net with the casing underneath clings firmly into the sausage surface. As a result, the casing and the net are difficult to remove, i.e. peeling is difficult after the product has been cured.

SUMMARY OF THE INVENTION

In a dry state, the fibrous casing is very rigid, however, it is humidified before being filled with sausage mixture, so that it becomes easy to handle. Moisturising is typically performed by dissolving the fibrous casing in a suitable liquid, water for instance, whereby the casing becomes twice as thick. After it has been stuffed, the casing is usually sealed at a suitable point with a fastening device, preferably a small metal clip, whose inner diameter thus depends on the thickness of the humidified fibrous casing. When drying, the fibrous casing shrinks, substantially resuming its original thickness, so that a small opening forms inside the clip. It has now been surprisingly found that this opening allows such an amount of air to be blown between the fibrous casing and the surface of the sausage mixture that appreciably facilitates detachment of the fibrous casing from the surface of the sausage stuffing.

A device has now been developed that allows the peeling process described above to be facilitated and partly automated.

The object of the invention is a device for detaching a fibrous casing from the surface of a cured processed meat product. The device is characterised by having a blowpipe adapted for blowing compressed air between the fibrous casing and the surface of the processed meat product, inside the sealing ring, through the opening formed as the fibrous casing is drying, and means for locking the fibrous casing on the blowpipe so as to steer compressed air into said opening.

Another object of the invention is a method for detaching a fibrous casing from the surface of a cured processed meat product, in which the device of the invention is used.

The invention also relates to a method for detaching a net-coated fibrous casing from the surface of a cured processed meat product that has been shaped with said net-coated fibrous casing and comprises projections on its surface, the method being characterised by blowing compressed air between the fibrous casing and the surface of the processed meat product.

Other preferred features of the device and the method of the invention are defined in the accompanying claims and in the detailed description below.

The device and the method in accordance with the invention are particularly usable in cases where a substantially inextensible net has been disposed on the outer surface of a removable fibrous casing.

BRIEF DESCRIPTION OF THE DRAWINGS

The present invention is described in greater detail below with reference to the accompanying FIGURE, which shows one embodiment of the device of the invention.

DETAILED DESCRIPTION OF THE INVENTION

The invention relates to a device for removing a fibrous casing from the surface of a cured processed meat product. The device comprises a blowpipe 1 for blowing compressed air, which is adapted to blow compressed air between the fibrous casing 5 and the surface of the processed meat product, inside a sealing ring 3, through the opening formed as the fibrous casing is drying, and means 4 for locking the fibrous casing 5 on the blowpipe 1 so as to steer compressed air into said opening. In addition, the invention relates to a method for removing a fibrous casing from the surface of a processed meat product, using the device of the method.

The outer diameter of the nozzle of the blowpipe 1 is preferably calibre-specific so as to be accommodated in the tail 2 remaining behind the sealing ring as the processed meat product is sealed within the fibrous casing 5, the nozzle of the blowpipe 1 for blowing compressed air having an inner diameter of preferably about 2 mm. The means 4 for locking the fibrous casing 5 on the blowpipe 1 are preferably steplessly adjustable jaws, which press the fibrous casing 5 against the blowpipe 1 with adequate pressure to maintain the fibrous casing 5 around the blowpipe 1 when compressed air is being blown into the fibrous casing 5. A person skilled in the art can readily determine this compression pressure. It is preferably about 5 bar, which steers the compressed air to be blown into the correct direction into the sealing ring opening.

In the method of the invention, the fibrous casing 5 is preferably locked on the compressed air blowpipe by gripping the tail 2 of the fibrous casing, which has remained behind the sealing ring 3 while the sausage mixture was sealed into the fibrous casing 5. The tail 2 has a length in the range of 3 to 10 cm, preferably about 5 cm. The blowpipe 1 is used to blow compressed air between the fibrous casing and the surface of the processed meat product under a steplessly adjustable pressure such that the compressed air is steered between the fibrous casing and the surface of the sausage stuffing, thus detaching the fibrous casing from the surface of the sausage stuffing.

The air blowing rate and thus its force varies as a function of the type and the baking period of the sausage mixture, and also of the force used for fastening the sealing ring. The pressure in the blowing device is from 0 to 8 bar, preferably less than 1 bar, the inner diameter of the nozzle of the blowpipe 1 being 2 mm for a sausage of salami type.

The removal of a fibrous casing can especially be facilitated in the preparation step of the fibrous casing by treating the fibrous casing so that it adheres to the sausage mixture surface as lightly as possible. This is preferably performed by impregnating the casing with a liquid of release type at the stage of preparation of the sausage.

The device and the method in accordance with the invention bring a solution to the special problem occurring in the use of a fibrous casing having a substantially inextensible net fastened to its surface, which clings firmly into the sausage mixture as the net casing is being stuffed. However, it should be noted that, without departing from the scope of protection of the accompanying claims, the device of the invention can also be used for instance with an elastic net, or as a means for facilitating skin removal from conventional processed meat products, which have been prepared without any net.

What is claimed is:

1. A device for detaching a fibrous casing from the surface of a cured processed meat product, which comprises:
    a blowpipe structured and arranged to blow compressed air between the fibrous casing and the surface of the processed meat product, through an opening formed as the fibrous casing is drying; and
    steplessly adjustable jaws for pressing the fibrous casing against the blowpipe so as to steer compressed air into said opening.

2. The device according to claim 1, wherein the blowpipe includes a nozzle having an outer diameter which is caliber-specific so as to be accommodated in a tail of fibrous casing remaining behind the sealing ring as the processed meat product is sealed within the fibrous casing.

3. The device according to claim 2, wherein the nozzle of the blowpipe has an inner diameter of 2 mm.

4. A method for detaching a fibrous casing from the surface of a cured processed meat product, which comprises:
    providing a device having a blowpipe structured and arranged to blow compressed air between the fibrous casing and the surface of the processed meat product, through an opening formed as the fibrous casing is drying; and steplessly adjustable jaws for pressing the fibrous casing against the blowpipe so as to steer compressed air into said opening; and
    blowing compressed air between the fibrous casing and the surface of the processed meat product.

5. The method according to claim 4, wherein the outer surface of the fibrous casing is coated with a substantially inextensible net.

6. The method according to claim 4, wherein the fibrous casing is locked on the blowpipe by gripping a tail of the fibrous casing remaining behind the sealing ring as the processed meat product is being sealed into the fibrous casing.

7. The method according to claim 4, wherein the compressed air is blown between the fibrous casing and the surface of the processed meat product at a low rate and under a pressure such that the fibrous casing detaches from the surface of the processed meat product.

8. The method according to claim 4, wherein the compressed air is blown between the fibrous casing and the surface of the processed meat product at a pressure of less than 1 bar.

9. The method according to claim 4, wherein the fibrous casing is a net-coated fibrous casing, and the surface of the processed meat product comprises protuberances.

* * * * *